Jan. 13, 1959 E. P. ANSTETT 2,868,057
SHEET METAL NAIL TAPERED OPPOSITE THE DRAWN PENETRATING END
Filed Aug. 2, 1956
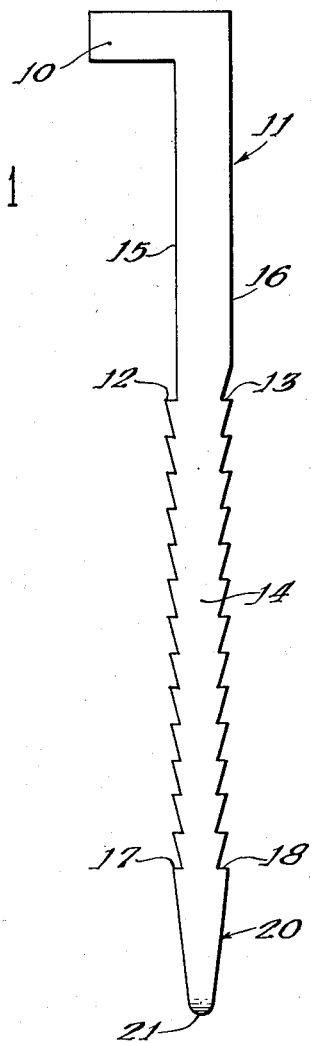
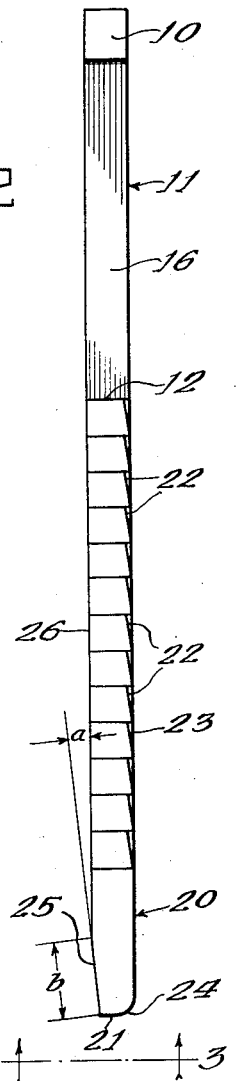
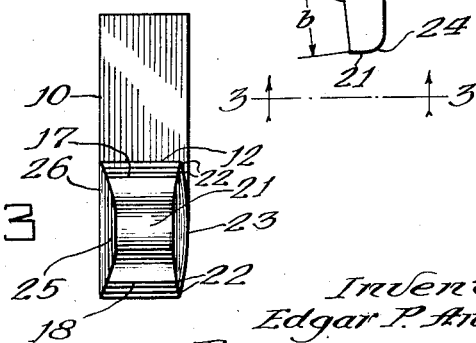
Inventor:
Edgar P. Anstett
By Schroeder, Hofgren,
Brady & Wegner
Attorneys United States Patent Office 2,868,057
Patented Jan. 13, 1959

2,868,057

SHEET METAL NAIL TAPERED OPPOSITE THE DRAWN PENETRATING END

Edgar P. Anstett, Chicago, Ill.

Application August 2, 1956, Serial No. 601,732

1 Claim. (Cl. 85—30)

This invention relates generally to fasteners of the type that are driven as for example, nails, brads, cleats, staples and the like. The invention more particularly relates to a fastener that is formed from sheet metal stock.

Sheet metal fasteners are now widely used in nailing machines which are adapted to receive a stick of nails in a magazine from which they are driven one at a time by a plunger which is struck by a workman.

Difficulty has been experienced when trying to drive these fasteners into hard wood. The fasteners may bend if they veer slightly off of a true straight line during the driving action. Some types of wood grains have a great tendency to make the fastener follow the grain, thus causing the fastener to curl rather than to remain straight. These problems are accentuated in fasteners of relatively long length as might be used to secure hard wood, tongue and groove flooring in place.

It is the general object of this invention to provide a new and improved fastener of the type illustrated and described.

Another object is to provide a fastener structure which will inherently avoid the difficulty previously encountered with such fasteners.

A further object is to provide a fastener structure combining excellent holding qualities with proper driving characteristics.

Other objects, features and advantages of the present invention will be apparent from the following description of a specific embodiment illustrated in the accompanying drawing in which:

Figure 1 is a plan view of a sheet metal cleat embodying the present invention.

Figure 2 is a side or edgewise view of the cleat shown in Figure 1.

Figure 3 is an end view taken substantially at line 3—3 in Figure 2.

The particular fastener chosen for the purpose of illustrating the present invention is one used in the securing of hard wood flooring in place. The fastener is generally termed a cleat and is stamped or blanked from sheet metal stock. The cleat has an L-shape head portion 10 formed integrally with a body including a shank portion 11 which is slightly wider than thick as shown in comparing Figures 1 and 2 respectively. In the specific cleat illustrated, the shank 11 is of generally uniform cross section from the head 10 to the uppermost pair of opposite barbs 12 and 13. The barbs are formed on the extension 14 of the shank 11 and are formed on two opposite sides which are in effect continuations of the sides 15 and 16 of the shank. In the preferred form, the barbs 12 and 13 are the widest apart with the barbs 17 and 18 at the lower end of the fastener being closest together, there being a gradual uniform taper between these respective pairs of barbs. It may be noted that barb 12 extends outwardly of surface 15. It has been found that the tapered barb structure gives the cleat a holding power much greater than other forms of fasteners. The lower or penetrating end 20 of the fastener has a tip 21 rounded in plan and of a particularly important shape in side view.

In blanking the nails from sheet metal stock, the metal material is formed in the female die partly within the elastic limit of the material and partly beyond the elastic limit. This results in a known phenomenon of drawing the metal into the female die at least in part. As illustrated in Figures 2 and 3, it will be noted that the barb points as illustrated at 22 are drawn inwardly toward the center of the fastener from the outer-most surface 23 of the fastener. This results in the surface 23 being somewhat rounded as seen in Figure 3.

The drawing of the metal is even more pronounced at the penetrating end of the fastener. The rounded end 24 at the extreme end 21 is due to this drawing action and places quite a rounded surface on the material penetrating end of the fastener. This rounded portion 24 generally cannot be avoided because of the necessity of blanking the cleats from relatively thick sheet metal stock. In the past, the rounded portion 24 has caused the cleats to drive irregularly rather than straight, particularly in hard wood.

The present invention provides a structure which offsets the effect of the rounded portion 24. The surface 25 on the opposite side of the fastener is inclined through an angle $a$ to the generally straight side 26 of the fastener by building up the punch in the area of the penetrating point of the cleat. The length of the resulting straight portion 25 generally extends over a distance $b$ illustrated in Figure 2. By forming this offsetting inclined surface on the cleat end, a relatively good symmetry for the penetrating end of the cleat is formed as illustrated in Figure 3. With this symmetry, the cleats will generally drive straight and true even though the wood receiving the cleat may be hard or have a difficult grain to penetrate.

The foregoing detailed description has been given for clearness of understanding only, and no unnecessary limitations should be understood therefrom, for some modifications will be obvious to those skilled in the art.

I claim:

A driven type fastener, comprising: a cleat having an integral laterally extending head and body blanked from sheet metal stock so that the cleat has throughout generally the thickness of the stock with metal edge portions drawn on one side of the cleat providing the usual rounded edge portions formed in the blanking, said cleat body having an elongated shank having its width at least as great as its thickness and a short penetrating end portion with symmetrically tapering lateral edges with said drawn rounded portion at the extreme end thereof forming a small rounded surface on one side of said extreme end portion, an opposed generally flat surface on the opposite side of said end portion tapering slightly to said extreme end toward said rounded surface, said end having a blunt surface extending across the end joining said rounded and tapering surfaces, said latter surfaces forming a penetrating end of less thickness than said stock and offsetting the tendency of said rounded portion of the penetrating end portion to curl the cleat when driven into material.

References Cited in the file of this patent

UNITED STATES PATENTS

| | | |
|---|---|---|
| 583,946 | Russell | June 8, 1897 |
| 904,814 | Sessagrant | Nov. 24, 1908 |
| 2,649,831 | Anstett | Aug. 25, 1953 |